(12) United States Patent
Eberle et al.

(10) Patent No.: US 6,290,234 B1
(45) Date of Patent: Sep. 18, 2001

(54) SHAFT ASSEMBLY HAVING IMPROVED SEAL ARRANGEMENT

(75) Inventors: Frederick Eberle; William P. Pizzichil; Dennis Thompson, all of Greenville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/407,183

(22) Filed: Sep. 27, 1999

(51) Int. Cl.[7] .................................................. F16J 15/40
(52) U.S. Cl. ........................ 277/411; 277/412; 277/421; 277/572; 277/924
(58) Field of Search ................................. 277/303, 309, 277/311, 316, 411, 412, 417, 421, 551, 572, 924

(56) References Cited

U.S. PATENT DOCUMENTS

| | | | |
|---|---|---|---|
| 3,289,953 | * | 12/1966 | Johnson et al. ........................ 277/412 |
| 3,445,121 | * | 5/1969 | Lineker ................................. 277/421 |
| 4,189,157 | * | 2/1980 | Mahan et al. ......................... 277/417 |
| 4,832,350 | * | 5/1989 | Orlowski .............................. 277/417 |
| 5,387,040 | * | 2/1995 | Firestone et al. ..................... 277/417 |

* cited by examiner

Primary Examiner—Chuck Y. Mah
Assistant Examiner—Enoch E Peavey
(74) Attorney, Agent, or Firm—Lloyd G. Farr; Alexander M. Gerasimow; William R. Walbrun

(57) ABSTRACT

A sealed, rotatable shaft assembly includes a housing that defines a bore that extends from an area exterior to the housing to an area interior to the housing. A shaft is rotatably disposed in the housing about an axis of the bore. The shaft extends through the bore between the interior area and the exterior area. An annular lip seal is disposed in the bore and is attached to one of the shaft and the housing. The lip seal extends from the one of the shaft and the housing to the other of the shaft and the housing in a contact seal so that rotation of the shaft with respect to the housing wears the lip seal to form a zero-clearance non-contacting seal. A labyrinth seal stage extends between the shaft and the housing. The labyrinth seal stage is disposed outward of the lip seal, with respect to the interior area and in communication with the lip seal.

10 Claims, 2 Drawing Sheets

US 6,290,234 B1

SHAFT ASSEMBLY HAVING IMPROVED SEAL ARRANGEMENT

BACKGROUND OF THE INVENTION

The present invention generally concerns rotatable shaft assemblies such as gear reducers and pumps. More particularly, the invention relates to these assemblies and their sealing arrangements.

Rotatable shaft assemblies typically include a housing with at least one axial bore that extends through the housing and through which a driven or driving shaft may pass. Generally, a seal extends between the housing and the shaft to prevent passage of exterior contaminants to the housing's interior area and to prevent escape of lubricant. In this regard, a lip seal may attach to the housing and extend radially inward to abut the rotating shaft so that passage of material is prevented from either direction across the seal. Such seals are advantageous in that they may prevent escape of lubricant from the housing interior if the assembly is inadvertently shifted or tilted during shipping. The rotating shaft may, however, wear the lip seal and thereby limit its useful life.

Labyrinth seals typically have a longer life. The one or more seal elements that form the labyrinth stages do not fully contact the shaft, due to a clearance fit and/or to the passage of lubricant between the seal element(s) and the shaft. These seals may, however, permit leakage of lubricant during shipping.

SUMMARY OF THE INVENTION

The present invention recognizes and addresses disadvantages of prior art constructions and methods.

Accordingly, it is an object of the present invention to provide an improved shaft assembly.

This and other objects of the present invention are accomplished by a sealed, rotatable shaft assembly having a housing defining a bore that extends from an area exterior to the housing to an area interior to the housing. A shaft is rotatably disposed in the housing about an axis of the bore. The shaft extends through the bore between the interior area and the exterior area. An annular lip seal is disposed in the bore and is attached to one of the shaft and the housing. The lip seal extends from the one of the shaft and the housing to the other of the shaft and the housing in a contact seal so that rotation of the shaft with respect to the housing wears the lip seal to form a zero-clearance non-contacting seal. A labyrinth seal stage extends between the shaft and the housing. The labyrinth seal stage is disposed axially outward of the lip seal, with respect to the interior area, and in communication with the lip seal.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
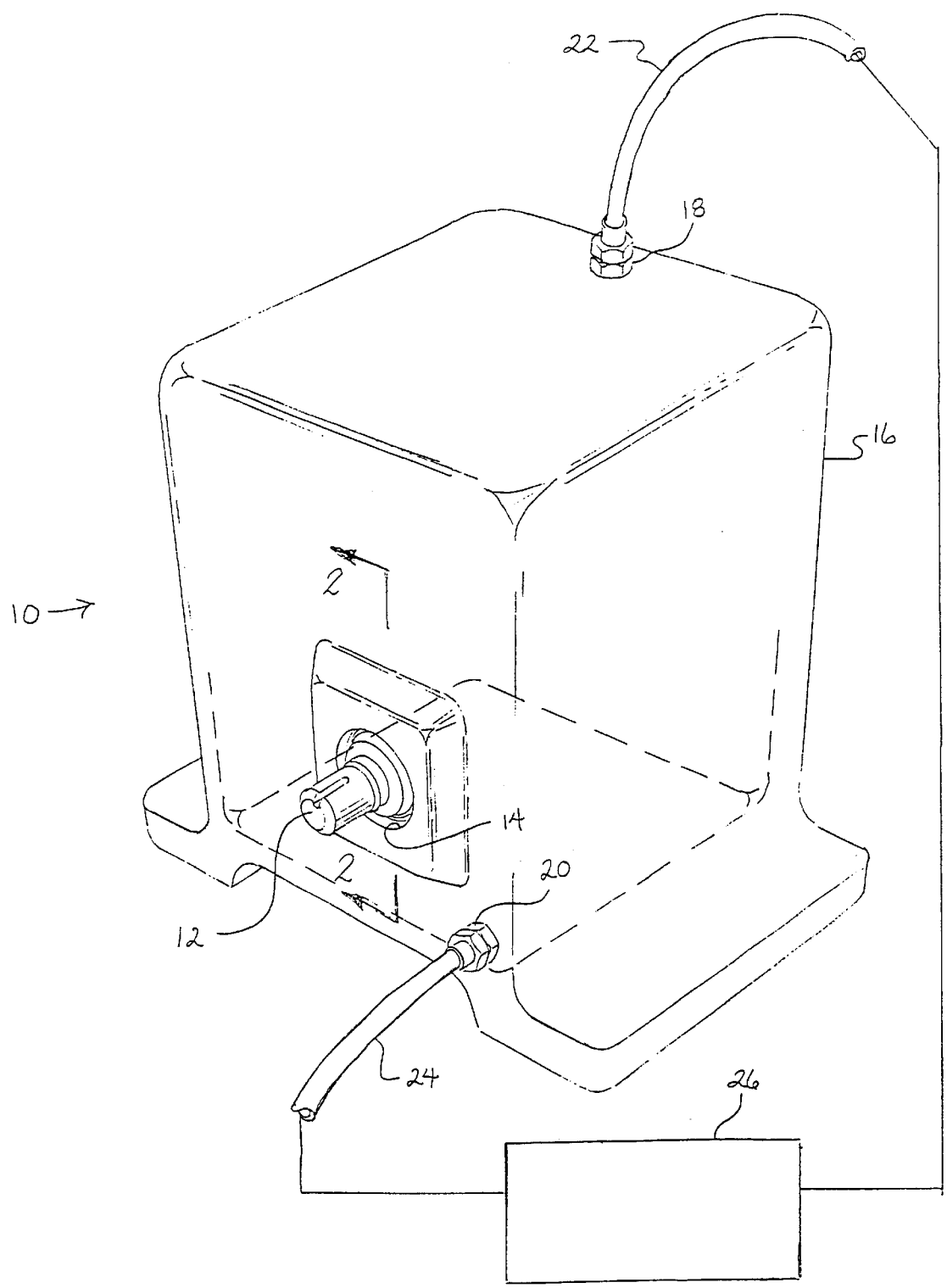
FIG. 1 is a perspective view of a rotating shaft assembly in accordance with a preferred embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates a gear reducer 10 having an output shaft 12 extending through a bore 14 in a housing 16. While the figures illustrate a gear reducer, it should be understood that the present invention may comprise a variety of mechanisms, such as motors, bearings and pumps, that include one or more rotating shafts extending through a housing from an exterior to an interior area. In these devices, a seal may be used to retain lubricant within the interior area and/or to prevent the ingress of exterior contaminants.

As should be understood in this art, the housing of gear reducer 10 encloses an interior area in which is disposed a series of step-down gears that drive output shaft 12 in response to a driven input shaft (not shown). Lubricant is introduced into the interior area through a fitting 18 and can be drained through a fitting 20. Fittings 18 and 20 may be normally closed during operation of the gear reducer or may remain open to tubing 22 and 24 to pass lubricant through a cooling stage 26.

Figure 2:
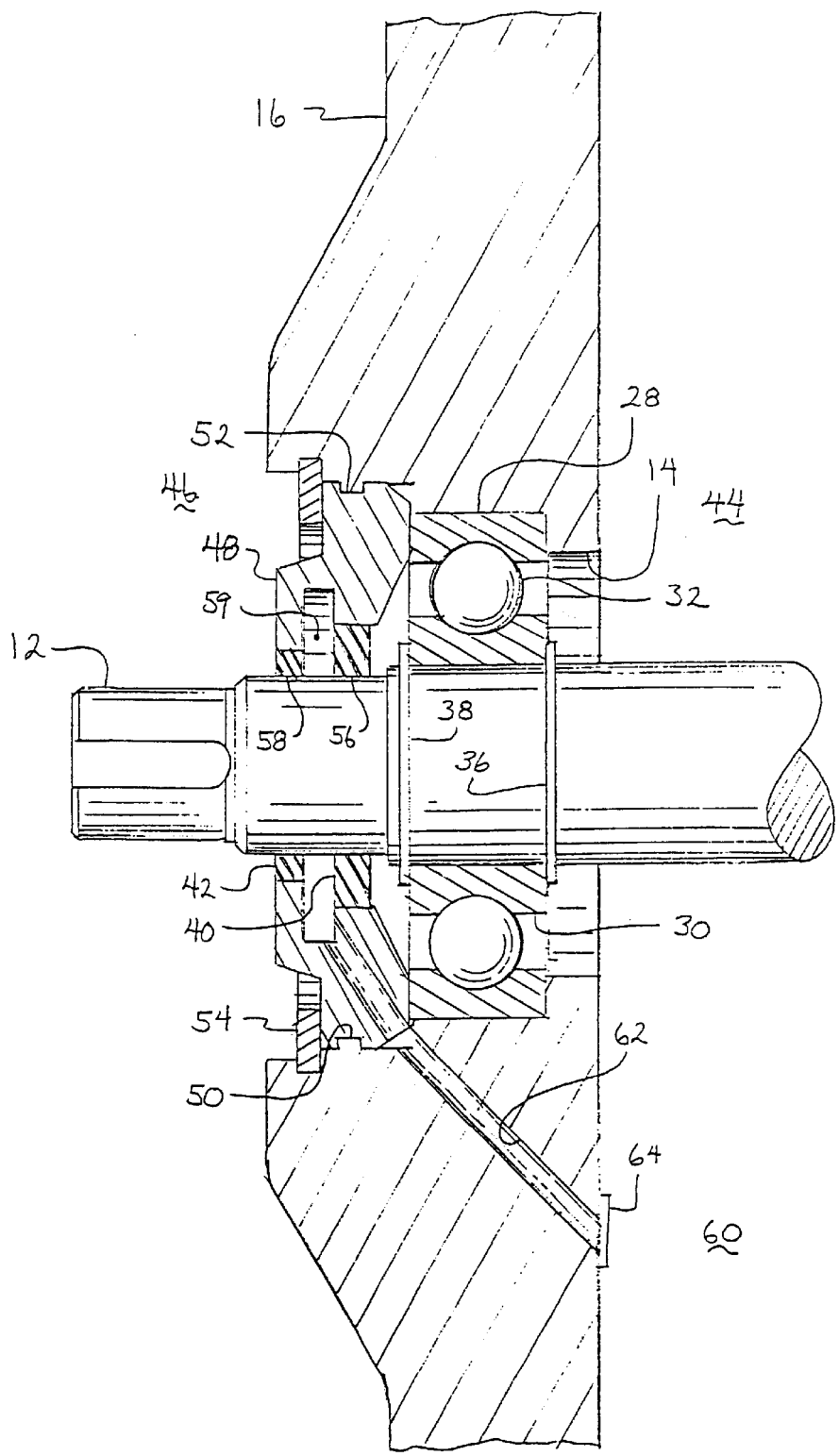
FIG. 2 is a cross-sectional view of the rotatable shaft assembly as shown in FIG. 1, taken along the line 2—2 as shown in FIG. 1.

Referring now to FIG. 2, shaft 12 is secured in housing 16 by a bearing having an outer race 28 and an inner race 30 separated by bearing balls 32. Retaining clips 36 and 38 secure the bearing axially with respect to the shaft. As noted above, it should be understood that the present invention may be employed in conjunction with various shaft assemblies. For example, where the shaft is supported elsewhere in the system, the bearing may be omitted at bore 14.

Two seals 40 and 42 seal the housing's interior area 44 from the exterior area 46. Each seal is attached to housing 16 by a carrier 48 that is received in bore 14. The bore may capture the carrier by any suitable means, for example by press fit and/or by a snap fit formed between an annular shoulder 50 defined in the bore and an annular channel 52 defined in the carrier. A retaining ring 54 additionally secures the carrier. The carrier may be made from aluminum or other metal, a polymer, or any other suitable material.

Inner seal 40 is a continuous annular lip seal made from an hydrogenated nitrile or other suitable material. A lip seal as discussed herein is a seal that contacts the sealed surface to prevent flow of lubricant and contaminants between the interior and exterior areas, in either axial direction. In the embodiment shown in FIG. 2, both of seals 40 and 42 are fixed by a press fit, or other suitable means, to corresponding shoulders of carrier 48. They extend radially inward to abut shaft 12, thereby preventing outward flow of lubricant from interior area 44 and inward flow of contaminants from exterior area 46.

Over time, however, rotation of shaft 12 wears the seal's contacting surfaces 56 and 58 until the seals no longer contact the shaft. This forms a zero-clearance non-contacting seal between each seal element 40 and 42 and the shaft. It should be understood that the rotating shaft typically exhibits a small degree of runout. Thus, "zero-clearance" as used herein refers to the condition where the rotating shaft has worn the seal's inner diameter to the outer diameter scribed by the shafts's rotation. Since runout is typically very small, for example less than 5/1000 of an inch, the actual gap between the seal's inner diameter and any corresponding point on the shaft's surface is typically very small. Accordingly, it should be understood that such gaps fall within the scope of "zero-clearance."

The period necessary to create the zero-clearance condition can vary, for example depending on the construction of the rotating shaft assembly and the seals, but generally falls between two and four years of regular use where the seal is lubricated. At this point, seal 40 forms a first labyrinth stage, and migrating lubricant within interior area 44 may pass between seal 40 and shaft 12 into an annular chamber 59 that is defined by an annular channel in carrier 48 between seals 40 and 42. Chamber 59 and seal 42 then form a second labyrinth seal stage axially outward of seal 40. As should be understood in this art, the first labyrinth seal stage further reduces the pressure of lubricant that escapes from interior area 44 between shaft 12 and seal 40. There is, therefore, minimal weeping of lubricant between seal 40 and shaft 12.

The rotating shaft tends to throw lubricant radially outward against the wall of chamber 59. The lubricant that collects in the chamber returns to a sump area 60 within area 44 through a drain bore 62 extending through carrier 48 and housing 16. Because turbulence and dynamic lubricant heads within housing 16 can pressurize the return path through drain 62, a baffling plate 64 may be disposed at the entry point to sump 60. As should be understood in the art, the baffling plate may comprise a perforated plate, a successive series of plates that form a tortuous flow path, or other suitable structure.

Since seal element 42 is initially a lip seal, it prevents escape of lubricant that may flow into chamber 59 through drain 62 from the sump during shipping and handling. After it wears to a zero-clearance non-contacting seal, and after the assembly is in its operative position, seal element 42 acts primarily to prevent ingress of external contaminants. Seal 40, also initially a lip seal, provides a primary lubricant seal between the shaft and the housing. When it wears to a zero-clearance non-contacting seal, it and the second labyrinth stage (including now-worn seal element 42) outward of seal 40 forms a labyrinth seal that can be expected to last throughout the gear reducer's operative life. Thus, the seal arrangement of the present invention combines the lip seal's fluid-tight sealing characteristics with the labyrinth seal's long life.

While one or more preferred embodiments of the invention have been shown and described above, it should be understood that any and all equivalent realizations of the present invention are included within the scope and spirit thereof. For example, outer seal 42 may be constructed initially as a contacting seal that bows axially inward or outward against shaft 12. Furthermore, seals 40 and 42 may be fixed to the shaft so that they extend radially outward to the housing. In addition, while carrier 48 provides the ability to exchange seals when necessary, for example due to a change in shaft diameter, and while the carrier may be considered a part of the housing, it should be understood that the housing may be unitarily constructed without a removable carrier. Still further, the labyrinth stage outward of the primary lip seal may be constructed in any suitable fashion.

Thus, the one or more embodiments depicted are presented by way of example only and are not intended as limitations upon the present invention, and it should be understood by those of ordinary skill in this art that the present invention is not limited thereto. Therefore, it is contemplated that any and all such embodiments are included in the present invention as may fall within the literal or equivalent scope of the appended claims.

What is claimed is:

1. A sealed, rotatable shaft assembly, said assembly comprising:

a housing defining a bore that extends from an area exterior to said housing to an area interior to said housing, said interior area containing lubricant therein;

a shaft rotatably disposed in said housing about an axis of said bore, said shaft extending through said bore between said interior area and said exterior area;

an annular lip seal disposed in said bore and attached to one of said shaft and said housing, said lip seal extending from said one of said shaft and said housing to the other of said shaft and said housing in a contact seal;

a labyrinth seal stage extending between said shaft and said housing, said labyrinth seal stage disposed axially outward of said lip seal, with respect to said interior area, and including an annular outer seal element spaced axially outward from said lip seal and an annular chamber separate from and disposed between said outer seal element and said lip seal and extending radially outward from said shaft; and a drain extending to a sump from said annular chamber.

2. The assembly as in claim 1, wherein said lip seal is attached to a carrier that is attached to said one of said shaft and said housing within said bore.

3. The assembly as in claim 1, wherein said outer seal element includes a lip seal that extends from one of said shaft and said housing to the other of said shaft and said housing in a contact seal so that rotation of said shaft with respect to said housing wears said second seal to form a zero-clearance seal.

4. The assembly as in claim 1, wherein said sump is within said interior area.

5. A sealed, rotatable shaft assembly, said assembly comprising:

a housing defining a bore that extends from an area exterior to said housing to an area interior to said housing, said interior area containing lubricant therein;

a shaft rotatably disposed in said housing about an axis of said bore, said shaft extending through said bore between said interior area and said exterior area;

a first annular lip seal disposed in said bore and attached to said housing, said first seal extending from said housing to said shaft in a contact seal;

a second annular lip seal disposed in said bore axially outward of, and spaced from, said first seal, said second seal attached to said housing and extending from said housing to said shaft in a contact seal so that rotation of said shaft with respect to said housing wears said second seal to form a zero-clearance seal;

an annular chamber separate from and disposed between said first lip seal and said second lip seal and extending radially outward from said shaft; and a drain extending to a sump from said annular chamber.

6. The assembly as in claim 5, wherein said first seal and said second seal are attached to a carrier that is attached to said housing within said bore.

7. The assembly as in claim 6, wherein said carrier is constructed of aluminum.

8. The assembly as in claim 5, wherein each of said first lip seal and said second lip seal is attached to said housing.

9. A gear reducer, said gear reducer comprising:
- a housing defining a bore that extends from an area exterior to said housing to an area interior to said housing;
- a shaft rotatably disposed in said housing about an axis of said bore, said shaft extending through said bore between said interior area and said exterior area;
- a bearing received in said bore and receiving said shaft to radially secure said shaft in said bore;
- a first annular lip seal disposed in said bore axially outward of said bearing and attached to said housing, said first seal extending from said housing to said shaft in a contact seal;
- a second annular lip seal disposed in said bore axially outward of, and spaced from, said first seal, said second seal attached to said housing and extending from said housing to said shaft in a contact seal so that rotation of said shaft with respect to said housing wears said second seal to form a zero-clearance seal;
- an annular chamber separate from and disposed between said first lip seal and said second lip seal and extending radially outward from said shaft; and
- a drain extending to a sump from said annular chamber.

10. The assembly as in claim 9, wherein said first seal and said second seal are attached to a carrier that is attached to said housing within said bore.

* * * * *